United States Patent [19]

Yamamoto

[11] Patent Number: 4,740,526

[45] Date of Patent: Apr. 26, 1988

[54] ELASTIC FOAMED MATERIAL CONTAINING LARGE AMOUNT OF METALLIC COMPONENT AND A METHOD FOR PRODUCING SAID MATERIAL

[76] Inventor: Keiichi Yamamoto, No. 13-11, Nakagawa, Ikuno-ku 5-chome, Osaka, Japan

[21] Appl. No.: 44,831

[22] Filed: May 1, 1987

Related U.S. Application Data

[63] Continuation-in-part of Ser. No. 674,047, Nov. 21, 1984, abandoned.

[51] Int. Cl.$^4$ .................................................. C08V 9/00
[52] U.S. Cl. ........................................ 521/92; 521/140; 523/136
[58] Field of Search .................. 523/136; 521/92, 140

[56] References Cited

U.S. PATENT DOCUMENTS

| | | | |
|---|---|---|---|
| 3,714,083 | 1/1973 | Nakayama et al. | 521/140 |
| 3,717,559 | 2/1973 | Oyama et al. | 521/140 |
| 4,226,945 | 10/1980 | Bucken et al. | 521/140 |
| 4,252,909 | 2/1981 | Honma et al. | 521/140 |
| 4,307,204 | 12/1981 | Vidal | 521/140 |
| 4,310,582 | 1/1982 | Stumpe, Jr. | 521/140 |
| 4,495,240 | 1/1985 | McCarthy | 521/140 |

*Primary Examiner*—Morton Foelak
*Attorney, Agent, or Firm*—Mason, Fenwick & Lawrence

[57] ABSTRACT

A pliable and elastic foamed material containing a large quantity of metallic grains or particles comprising a foamed rubber matrix and metallic grains or particles contained in said matrix in the amount of not less than the parts by weight of said rubber matrix, said foamed rubber matrix being composed of a mixture of 100 parts by weight of a first rubber material of a number-average molecular weight of more than 100,000 and 40 to 45 parts by weight of a second rubber material of a number-average molecular weight of from 2,000 to 12,000.

7 Claims, No Drawings

ELASTIC FOAMED MATERIAL CONTAINING LARGE AMOUNT OF METALLIC COMPONENT AND A METHOD FOR PRODUCING SAID MATERIAL

CROSS-REFERENCE TO RELATED APPLICATION

Continuation-in-part of U.S. patent application Ser. No. 674,047, filed Nov. 21, 1984 now abandoned.

FIELD OF THE INVENTION

The present invention relates to a pliable and elastic foamed rubber material containing a large amount of a metallic component and a method for producing said material.

BACKGROUND OF THE INVENTION

Hitherto, the amount of a metallic component to be mixed with a natural rubber, synthetic resin and the like was limited not to exceed over 5 to 20 parts by weight to 100 parts by weight of the rubber base material on the ground that, if exceeded, a scorch phenomenon arises which makes it impossible to process the material.

Therefore, the present invention was developed in an effort to overcome the above-mentioned difficulties, and it is the primary object of the invention to provide a new and improved sheet-like pliable and elastic foamed rubber material having a large amount of a metallic component that can make X-ray shielding clothes, clothes for use in medical treatment and various products utilizing a magnetic force.

SUMMARY OF THE INVENTION

The present invention relates to a pliable and elastic foamed material containing a large quantity of metallic grains or particles. In a preferred embodiment, the elastic material is made up of a foamed rubber matrix with metallic grains or particles contained therein in an amount not less than the parts by weight of the rubber matrix. The foamed rubber matrix is composed of a mixture of 100 parts by weight of a first rubber material of a number-average molecular weight of more than 100,000 and 40 to 45 parts by weight of a second rubber material of a number-average molecular weight of from 2,000 to 12,000.

DETAILED DESCRIPTION OF THE PREFERRED EMBODIMENTS

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

According to the teachings of the present invention, a pliable and elastic foamed material containing a large quantity of metallic grains or particles in accordance with the present invention basically comprises a foamed rubber matrix and metallic grains or particles contained therein in an amount not less than the parts by weight of the rubber matrix.

A matrix either of a natural rubber or a synthetic rubber is made by mixing together 100 parts by weight of a first rubber material (polychloroprene rubber or natural rubber) of a number-average molecular weight $M_n$ of more than 100,000, preferably of about 200,000 and 40 to 45 parts by weight of a second rubber material (low molecular liquid polychloroprene rubber or low molecular liquid NBR) of a number-average molecular weight $M_n$ of from 2,000 to 12,000.

The metallic grains or particles are uniformly dispersed in the mixture in an amount not less than the parts by weight of the rubber matrix. For example, more than 600 parts by weight can be contained in the matrix.

When producing a rubber matrix, a blowing agent, a cross-linking agent, a cross-linking auxiliary, a softener, antioxidant and the like are added in the mixture and mixed up together, and a desired quantity of metallic grains or particles not less than the parts by weight of the rubber matrix are added in the mixture. This is followed by an aging process where the mixture is left to stand for 24 hours, after which the material not yet cross-linked is placed in a predetermined metal mold, pressed and heated, whereby a contained blowing agent is decomposed at the fixed temperature, and then a cross-linking reaction progresses, whereupon the material expands by virtue of a gas pressure and a decomposition heat at the time of decomposing the blowing agent due to an exhaust pressure. The material is therefore forced out of the metal mold. Depending upon the intended use, the foamed material can have a closed or open cell construction by varying the weight of the material at the time of placing it in the metal mold.

The foamed rubber material thus produced is then placed in another pre-arranged metal mold and pressed to discharge any undecomposed gas. The cross linking reaction is then completed. The foamed rubber material is then cut into thin and flat sheets of any desired thickness. Synthetic fabric sheets of high elasticity such as Nylon and the like can then be bonded onto both surfaces of the sheet material, whereafter the intended products can be manufactured by cutting into any desired shape and processing the sheet-like flat material.

The following examples are given for the purpose of illustrating the present invention.

Examples 1 to 3 show a composition for an elastic foamed material containing metallic grains or particles that can shield radiation. Measurement values of each elastic foamed material obtained in the three examples are also shown in accordance with a Standard X-Ray Protecting Test. The test was carried out to obtain the lead equivalent by measuring X-Ray decay values in conformity to JIS Z 4501 (Japanese Standard) "Testing Method of Lead Equivalent for X-Ray Protectors."

The testing conditions were as follows:
X-Ray Shielding Enclosure: Type MG151 of Philips Corp. (smoothing circuit, focus size: 3.0 mm Be)
X-Ray tube terminal voltage and tube current: 100 KV, 10 m, A
Additive filtering plate: 2.0 mm Al
Distance between test sample and X-Ray tube: 100 mm
Distance between test sample and measuring instrument: 20 cm
Measuring instrument: Ionization chamber irradiation ray meter by Victorian Corp. Radcon II, 555-IMA Prop.

An X-Ray shielding chamber was also used. Measurement of the hardness of the various foamed rubber materials was effected by Type 3 ASKA-C Hardness Scale in Japan.

Examples 4 to 6 show a composition for an elastic foamed material containing metallic grains or particles composed of a magnetic material, and a magnetization process was carried out at the time of manufacturing the intended products. The hardness of the foamed rubber materials was measured in the same way as in Examples 1 to 3.

The number-average molecular weight $M_n$ of a polychloroprene rubber and a natural rubber for the rubber material used in Examples 1 to 6 is more than 100,000 and about 200,000 and the number-average molecular weight $M_n$ of a low molecular liquid polychloroprene and a low molecular liquid NBR is from 2,000 to 12,000.

EXAMPLE 1

| | (parts by weight) |
|---|---|
| Polychloroprene rubber | 100 |
| Lead oxide | 660 |
| Zinc oxide | 5 |
| Magnesium oxide | 3 |
| Low molecular liquid polychloroprene | 40 |
| Cross-linking agent | 3 |
| Cross-linking auxiliary | 1 |
| Antioxidant | 5 |
| Blowing Agent | 8 |
| Suntguard PVI | 0.1 |
| (Agent for controlling velocity of vulcanization and crosslinking) | |
| Test results: | |
| Surface hardness (ASKA-C Hardness Scale) | 28°–30° |
| Apparent specific gravity | 1.02 |
| 3 mm sheet lead equivalent | 0.10 mm Pb |
| 5 mm sheet lead equivalent | 0.24 mm Pb |

EXAMPLE 2

| | (parts by weight) |
|---|---|
| Natural rubber | 100 |
| Lead oxide | 1100 |
| Zinc oxide | 5 |
| Magnesium oxide | 3 |
| Low molecular liquid NBR | 40 |
| Accelerator | 3 |
| Vulcanizing agent | 3 |
| Paraffin wax | 2 |
| Antioxidant | 2 |
| Lead Stearate | 7 |
| Blowing Agent | 6 |
| Suntguard PVI | 0.4 |
| Test results: | |
| Surface hardness (ASKA-C Hardness Scale) | 50°–52° |
| Apparent specific equivalent | 2.01 |
| 3 mm sheet lead equivalent | 0.43 mm Pb |
| 5 mm sheet lead equivalent | 0.52 mm Pb |

EXAMPLE 3

| | (parts by weight) |
|---|---|
| Polychloroprene rubber | 100 |
| Lead oxide | 1200 |
| Zinc oxide | 5 |
| Magnesium oxide | 3 |
| Low molecular liquid polychloroprene | 45 |
| Cross-linking agent | 3 |
| Cross-linking auxiliary | 1 |
| Lead stearate | 5 |
| Antioxidant | 5 |
| Blowing Agent | 7 |
| Suntguard PVI | 0.04 |
| Test results: | |
| Surface hardness (ASKA-C Hardness Scale) | 45°–47° |
| Apparent specific gravity | 1.95 |
| 1.7 mm sheet lead equivalent | 0.31 mm Pb |
| 1.0 mm sheet lead equivalent | 0.20 mm Pb |

EXAMPLE 4

| | (parts by weight) |
|---|---|
| Polychloroprene rubber | 100 |
| Barium ferrite | 500 |
| Nickel ferrite | 500 |
| Zinc oxide | 5 |
| Magnesium oxide | 3 |
| Low molecular liquid polychloroprene | 40 |
| Cross-linking agent | 3 |
| Cross-linking auxiliary | 1 |
| Antioxidant | 5 |
| Blowing Agent | 8 |
| Suntguard PVI | 0.1 |
| Test results: | |
| Surface hardness (ASKA-C Hardness Scale) | 25°–27° |
| Apparent specific gravity | 1.35 |

EXAMPLE 5

| | (parts by weight) |
|---|---|
| Natural Rubber | 100 |
| Barium ferrite | 500 |
| Magnesium ferrite | 500 |
| Lead oxide | 5 |
| Magnesium oxide | 3 |
| Low molecular liquid NBR | 40 |
| Vulcanizing agent | 3 |
| Vulcanizing accelerator | 3 |
| Microparaffin wax | 2 |
| Antioxidant | 2 |
| Stearin | 7 |
| Blowing agent | 6 |
| Suntguard PVI | 0.4 |
| Test results: | |
| Surface hardness (ASKA-C Hardness Scale) | 27°–28° |
| Apparent specific gravity | 1.28 |

EXAMPLE 6

| | (parts by weight) |
|---|---|
| Polychloroprene rubber | 100 |
| Barium ferrite | 700 |
| Nickel ferrite | 300 |
| Zinc oxide | 5 |
| Magnesium oxide | 3 |
| Low molecular liquid polychloroprene | 45 |
| Cross-linking agent | 3 |
| Cross-linking auxiliary | 1 |
| Antioxidant | 5 |
| Blowing agent | 7 |
| Suntguard PVI | 0.4 |
| Test Results: | |
| Surface hardness (ASKA-C Hardness Scale) | 23°–25° |
| Apparent specific gravity | 1.33 |

Furthermore, good results come above when the product obtained in Example 1 is used for the prevention of electric wave obstruction, as a shelter of high frequency, or used as a noise absorbent because it has a superior sound arresting property. The products obtained in Examples 2 and 3 are also used for removing dust and dirt in medical treatments, non-destructive testings and plants utilizing atomic energy both for the plant's equipments and installments. Further, the products obtained in Examples 4 to 6 are used for preserving health and utilizing a magnet force. Furthermore, the product in each Example is easy to handle because of the extremely light apparent specific gravity and the high degree of elasticity.

Thus, the present invention can provide foamed rubber material containing a large quantity of metallic grains or particles without causing a scorch phenomenon as in the prior arts. Mixing a low number-average molecular weight $M_n$ of from 2,000 to 12,000 liquid polymer in accordance with the present invention can decrease the frictional heat generated from contacting with metallic grains or particles. Further, the additives are allowed to disperse uniformly in the material, so that the scorch phenomenon is prevented and does not occur. In this way, an elastic foamed rubber material having a desired quantity of metallic grains or particles is obtained, which is applicable for use in various fields and industries.

From the above, it is apparent that many modifications and variations of the present invention are possible in liquid of the above teachings. It is therefore to be understood that, within the scope of the appended claims, the invention may be practiced otherwise than as specifically described.

What I claim is:

1. A pliable and elastic foamed cross-linked x-ray shielding material containing a large quantity of metallic grains or particles comprising:
    a foamed rubber matrix composed of a mixture of 100 parts by weight of a first rubber material and a number-average molecular weight of more than 100,000;
    40 to 45 parts by weight of a second rubber material of a number-average molecular weight of from 2,000 to 12,000; and
    metallic grains or particles uniformly dispersed in said mixture in an amount of from 660 to 1200 parts by weight of said rubber matrix.

2. The material according to claim 1, wherein said metallic grains or particles are of a type which can shield radiation.

3. The material according to claim 1, wherein said metallic grains or particles are magnetized.

4. The material according to claim 1, wherein said first rubber material is either polychloroprene or natural rubber and said second rubber material is either low molecular liquid polychloroprene or low molecular liquid natural rubber.

5. The material according to claim 1, wherein said metallic grains or particles are selected from the group consisting essentially of lead oxide, zinc oxide and magnesium oxide.

6. The material according to claim 1, wherein said metallic grains or particles are made of material selected from the group consisting essentially of barium ferrite, nickel ferrite, zinc oxide and magnesium oxide.

7. The material according to claim 1, wherein said metallic grains or particles are made of material selected from the group consisting essentially of barium ferrite, magnesium ferrite, lead oxide and magnesium oxide.

* * * * *

UNITED STATES PATENT AND TRADEMARK OFFICE
CERTIFICATE OF CORRECTION

PATENT NO. : 4,740,526
DATED : April 26, 1988
INVENTOR(S) : Keiichi Yamamoto

It is certified that error appears in the above-identified patent and that said Letters Patent is hereby corrected as shown below: On the title page, Item [76]

Please delete the address listed for the inventor, "No. 13-11, Nakagawa, Ikuno-ku 5-chome, Osaka, Japan" and insert the correct address --No. 13-11, Nakagawa 5-chome, Ikuno-ku, Osaka, Japan--.

Signed and Sealed this

First Day of June, 1993

Attest:

MICHAEL K. KIRK

*Attesting Officer*     *Acting Commissioner of Patents and Trademarks*